(12) United States Patent
Park et al.

(10) Patent No.: US 11,518,314 B2
(45) Date of Patent: Dec. 6, 2022

(54) GLOVE BOX APPARATUS

(71) Applicants: HYUNDAI MOBIS CO., LTD., Seoul (KR); DONGKOOK IND. CO., LTD., Seoul (KR)

(72) Inventors: Jae Whoan Park, Yongin-si (KR); Dong Il Son, Ulsan (KR); Chang Woo Kang, Hwaseong-si (KR); Tae Yong Eom, Ulsan (KR)

(73) Assignees: HYUNDAI MOBIS CO., LTD., Seoul (KR); DONGKOOK IND. CO., LTD., Seoul (KR)

( * ) Notice: Subject to any disclaimer, the term of this patent is extended or adjusted under 35 U.S.C. 154(b) by 475 days.

(21) Appl. No.: 16/664,566

(22) Filed: Oct. 25, 2019

(65) Prior Publication Data
US 2020/0130594 A1 Apr. 30, 2020

(30) Foreign Application Priority Data
Oct. 25, 2018 (KR) .......................... 10-2018-0127840

(51) Int. Cl.
*B60R 7/06* (2006.01)
*B60R 11/00* (2006.01)

(52) U.S. Cl.
CPC .......... *B60R 7/06* (2013.01); *B60R 2011/0043* (2013.01)

(58) Field of Classification Search
CPC ..... B60R 7/06; B60R 2011/0043; B60R 7/04; E05F 15/41; E05F 15/60; E05Y 2201/684; E05Y 2900/538

USPC .......................................... 296/37.12
See application file for complete search history.

(56) References Cited

U.S. PATENT DOCUMENTS

| | | | | |
|---|---|---|---|---|
| 1,464,458 A | * | 8/1923 | Whartenby | E05B 65/0057 27/35 |
| 5,613,716 A | * | 3/1997 | Cafferty | E05B 77/36 292/201 |
| 7,121,605 B2 | * | 10/2006 | DePue | B60R 7/06 296/37.12 |
| 8,596,704 B2 | * | 12/2013 | Sielhorst | E05B 81/66 296/37.8 |
| 8,668,239 B2 | * | 3/2014 | Doll | E05D 7/06 312/334.7 |
| 9,004,550 B2 | * | 4/2015 | Carabalona | E05B 79/20 292/45 |
| 9,187,177 B2 | * | 11/2015 | Schmitz | B64D 11/003 |
| 10,544,608 B2 | * | 1/2020 | Stoia | E05B 81/80 |
| 10,612,278 B2 | * | 4/2020 | Ben Abdelaziz | E05B 77/54 |

(Continued)

FOREIGN PATENT DOCUMENTS

| | | | |
|---|---|---|---|
| DE | 102017112007 A1 * | 12/2018 | B60R 25/00 |
| EP | 2209960 B1 * | 6/2012 | B60R 7/06 |

(Continued)

*Primary Examiner* — Pinel E Romain
(74) *Attorney, Agent, or Firm* — NSIP Law

(57) ABSTRACT

A glove box apparatus may include: a fixed part fixed to a vehicle body, and having a guide rail installed at a side surface thereof; a housing having a protrusion part moved along the guide rail, and configured to open/close the fixed part; a sensor part configured to sense a contact with the protrusion part; and a driving part configured to move the housing to open/close the fixed part, and move the housing toward the fixed part when the contact between the sensor part and the protrusion part is released.

10 Claims, 5 Drawing Sheets

(56) References Cited

U.S. PATENT DOCUMENTS

| | | | |
|---|---|---|---|
| 10,731,382 B2* | 8/2020 | Ketels | E05C 9/043 |
| 10,738,512 B2* | 8/2020 | Ketels | E05B 51/005 |
| 11,098,505 B2* | 8/2021 | Wiepen | E05B 83/30 |
| 11,124,126 B2* | 9/2021 | Park | E05D 15/582 |
| 11,148,603 B2* | 10/2021 | Gnielka | B60R 7/06 |
| 11,326,383 B2* | 5/2022 | Rapetti | E05F 15/627 |
| 2004/0041426 A1* | 3/2004 | Lee | B60R 7/06 |
| | | | 296/37.12 |
| 2004/0051334 A1* | 3/2004 | Park | B60R 7/06 |
| | | | 296/37.12 |
| 2004/0174570 A1* | 9/2004 | Plunkett | H04N 1/405 |
| | | | 358/3.13 |
| 2005/0200137 A1* | 9/2005 | Nelsen | E05B 81/15 |
| | | | 292/201 |
| 2008/0290682 A1* | 11/2008 | Sauer | B60R 7/06 |
| | | | 296/37.12 |
| 2010/0001539 A1* | 1/2010 | Kikuchi | E05B 77/06 |
| | | | 292/138 |
| 2011/0018286 A1* | 1/2011 | Mitchell, Jr. | B60R 7/06 |
| | | | 292/173 |
| 2016/0137137 A1* | 5/2016 | Shibata | B60R 7/06 |
| | | | 296/37.12 |
| 2018/0171679 A1* | 6/2018 | Im | E05B 81/34 |
| 2020/0017031 A1* | 1/2020 | Bauernfeind | B60R 7/04 |
| 2020/0180514 A1* | 6/2020 | Gnielka | E05B 83/30 |
| 2020/0200268 A1* | 6/2020 | Davis | F16H 1/28 |
| 2021/0347297 A1* | 11/2021 | Cuvillier | B60Q 3/62 |
| 2021/0355736 A1* | 11/2021 | Kim | E05F 15/649 |
| 2021/0356772 A1* | 11/2021 | Schwepper | G02F 1/0121 |
| 2021/0376321 A1* | 12/2021 | Kobayashi | H01M 10/054 |

FOREIGN PATENT DOCUMENTS

| | | | |
|---|---|---|---|
| KR | 10-1306297 B1 | 9/2013 | |
| WO | WO-2019152814 A1 * | 8/2019 | B60R 7/04 |

* cited by examiner

GLOVE BOX APPARATUS

CROSS-REFERENCE TO RELATED APPLICATION

The present application claims priority under 35 U.S.C. § 119(a) to Korean Patent Application No. 10-2018-0127840 filed on Oct. 25, 2018 in the Korean Intellectual Property Office, which is incorporated herein by reference in its entirety.

BACKGROUND

1. Technical Field

Embodiments of the present disclosure relate to a glove box apparatus, and more particularly, to a glove box apparatus which can prevent damage due to a malfunction when closing an opened glove box, such that the glove box can normally operate.

2. Related Art

An electric glove box apparatus enables a user to electrically open/close a glove box. In such an electric glove box apparatus, a user tends to manually and forcibly close the glove box without using an on/off method based on a switch operation, with the glove box opened.

At this time, a force more than needed may be applied to a gear train within an actuator for opening/closing the glove box or a link for transferring the glove box, or other structures in the electric glove box apparatus. Then, the gear train, the link or the other structures may be damaged. Therefore, there is a need for a structure capable of solving the problem.

The related art of the present invention is disclosed in Korean Patent No. 10-1306297 published on Sep. 3, 2013 and entitled "Manual Opening Device of Electric Glove Box for Vehicle".

SUMMARY

Various embodiments are directed to a glove box apparatus which can prevent damage due to a malfunction when closing an opened glove box, such that the glove box can normally operate.

In an embodiment, a glove box apparatus may include: a fixed part fixed to a vehicle body, and having a guide rail installed at a side surface thereof; a housing having a protrusion part moved along the guide rail, and configured to open/close the fixed part; a sensor part configured to sense a contact with the protrusion part; and a driving part configured to move the housing to open/close the fixed part, and move the housing toward the fixed part when the contact between the sensor part and the protrusion part is released.

The guide rail may have a guide groove for guiding the movement of the protrusion part released from the contact with the sensor part.

The guide groove may be formed upward on one side of the guide rail.

When the protrusion part is moved to the guide groove, the contact between the protrusion part and the sensor part may be released.

The sensor part may include: a sensor body mounted on the guide rail; and a contact part having one end mounted on the sensor body and the other end spaced apart from the sensor body, and elastically deformed by pressurization of the protrusion part.

The protrusion part may include: a protrusion body moved along the guide rail or the guide groove; and a pressurization protrusion mounted on the protrusion body so as to pressurize the contact part.

The protrusion body may have an outer diameter smaller than the width of the guide rail, and the pressurization protrusion may have an outer diameter larger than the width of the guide rail.

The glove box apparatus may further include a sensing switch part mounted on the housing, and configured to sense separation between the housing and the fixed part.

The guide rail may be formed in a curved shape.

In accordance with the embodiment of the present invention, the glove box apparatus can prevent damage due to a malfunction when closing the glove box, such that the glove box can normally operate at all times.

Furthermore, since the glove box can normally operate even in case of a malfunction, the maintenance cost of the glove box can be reduced.

DETAILED DESCRIPTION

Hereinafter, a glove box apparatus will be described below with reference to the accompanying drawings through various examples of embodiments. It should be noted that the drawings are not to precise scale and may be exaggerated in thickness of lines or sizes of components for descriptive convenience and clarity only.

Furthermore, the terms as used herein are defined by taking functions of the disclosure into account and can be changed according to the custom or intention of users or operators. Therefore, definition of the terms should be made according to the overall disclosures set forth herein.

Figure 1:
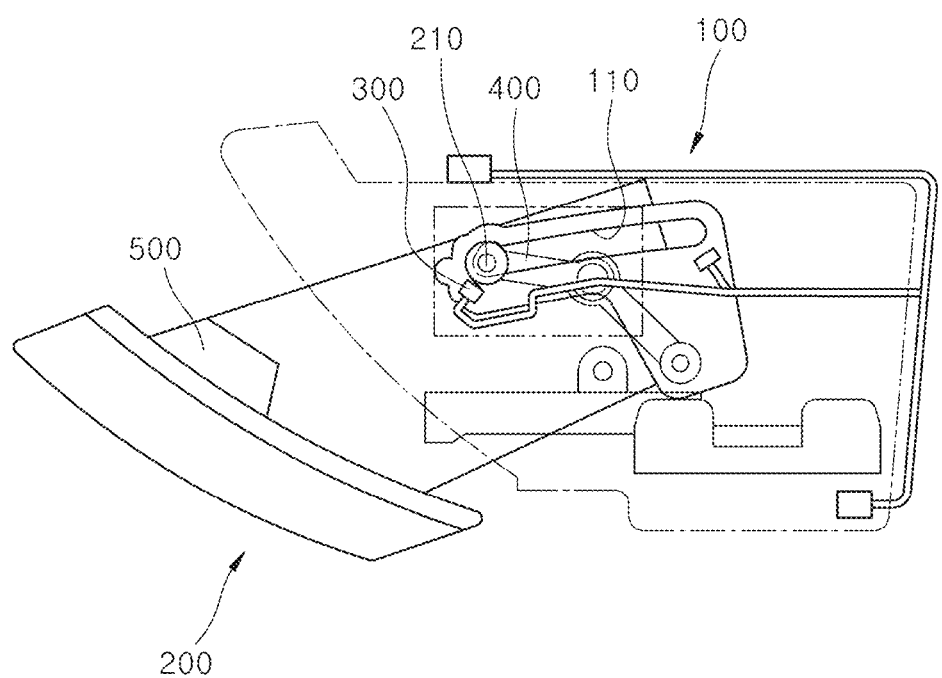
FIG. 1 is a conceptual view schematically illustrating that a housing is opened from a fixed part in a glove box apparatus in accordance with an embodiment of the present invention.
Figure 2:
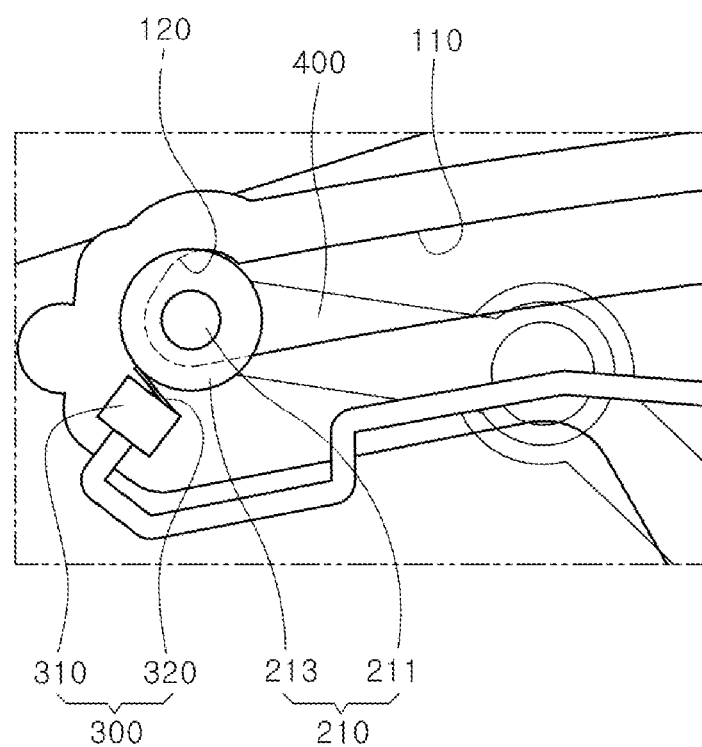
FIG. 2 is a partial expanded view schematically illustrating the periphery of a sensor part of FIG. 1.
Figure 3:
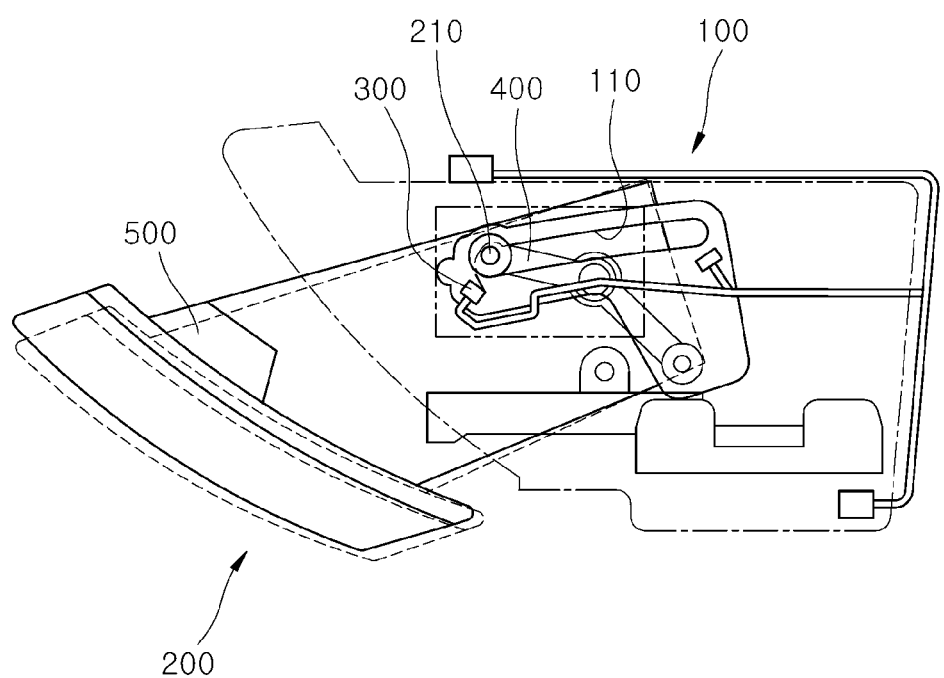
FIG. 3 is a conceptual view schematically illustrating that the housing is manually moved in the glove box apparatus in accordance with the embodiment of the present invention.
Figure 4:
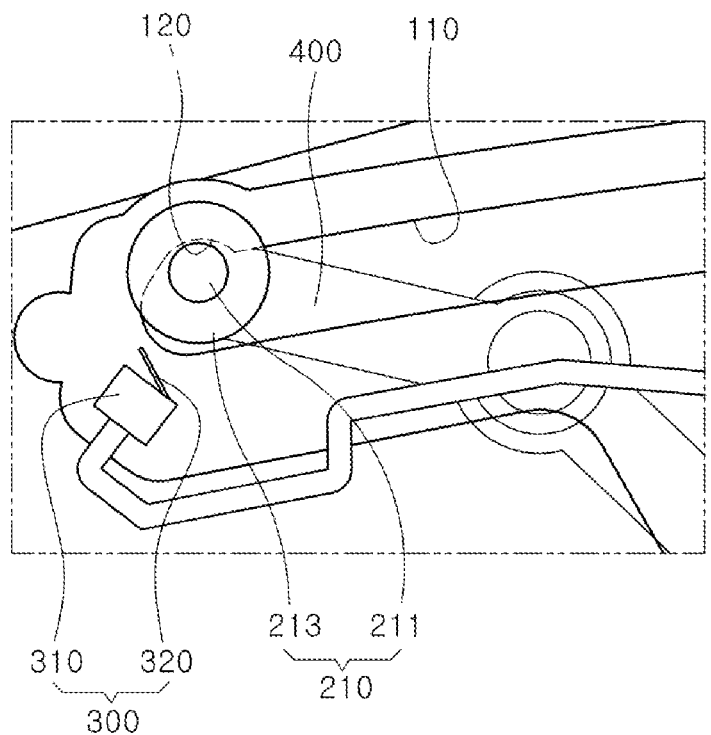
FIG. 4 is a partial expanded view schematically illustrating the periphery of a sensor part of FIG. 3.
Figure 5:
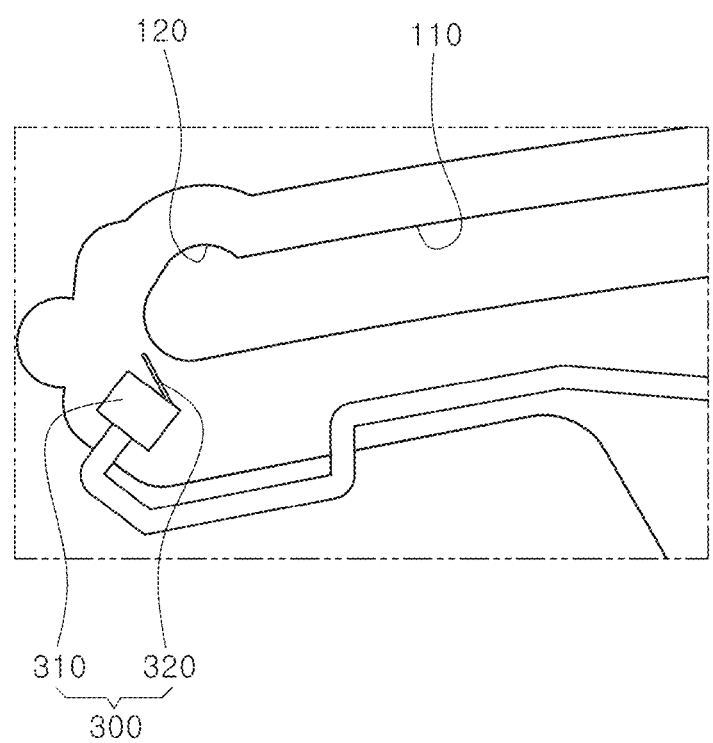
FIG. 5 is a conceptual view schematically illustrating a guide rail in the glove box apparatus in accordance with the embodiment of the present invention.

FIG. 1 is a conceptual view schematically illustrating that a housing is opened from a fixed part in a glove box apparatus in accordance with an embodiment of the present invention, FIG. 2 is a partial expanded view schematically illustrating the periphery of a sensor part of FIG. 1, FIG. 3 is a conceptual view schematically illustrating that the housing is manually moved in the glove box apparatus in accordance with the embodiment of the present invention, FIG. 4 is a partial expanded view schematically illustrating the periphery of a sensor part of FIG. 3, and FIG. 5 is a conceptual view schematically illustrating a guide rail in the glove box apparatus in accordance with the embodiment of the present invention.

Referring to FIGS. 1 to 5, the glove box apparatus in accordance with the embodiment of the present invention includes a fixed part 100, a housing 200, a sensor part 300, a driving part 400 and a sensing switch part 500.

The fixed part 100 is fixed to a vehicle body (not illustrated), and has a guide rail 110 installed at a side surface thereof. In the present embodiment, the fixed part 100 is formed in a passenger seat dashboard of the vehicle body.

The guide rail 110 formed at the side surface of the fixed part 100 provides a path along which a protrusion part 210 of the housing 200 is moved. The guide rail 110 is formed in a curved shape such that the housing 200 can be turned in the fixed part 100.

The guide rail 110 has a guide groove 120 for guiding the movement of the protrusion part 210 when the housing 200 is not moved by an operation of the driving part 400 but manually moved. When the housing 200 is manually moved, it may indicate that the housing 200 is moved by a passenger in the vehicle. That is, as illustrated in FIG. 3, the manual operation indicates that the passenger in the vehicle pushes the housing 200 to the right such that the housing 200 closes the fixed part 100.

The guide groove 120 is formed upward on one side of the guide rail 110 (the left side in FIG. 5). When the housing 200 is manually moved toward the fixed part 100, the protrusion part 210 is induced toward the guide groove 120 while moved by the movement of the housing 200. While moved to the guide groove 120, the protrusion part 210 is released from pressurization of the sensor part 300.

The housing 200 includes the protrusion part 210 moved along the guide rail 110, and opens/closes the fixed part 100. The housing 200 opens/closes the fixed part 100 through an operation of the driving part 400 connected to the protrusion part 210. The protrusion part 210 formed on the side surface of the housing 200 is installed movably along the guide rail 110.

The protrusion part 210 may include a protrusion body 211 and a pressurization protrusion 213. The protrusion body 211 has an outer diameter smaller than the width of the guide rail 110 or the guide groove 120, and is moved along the guide rail 110 or the guide groove 120.

The pressurization protrusion 213 is mounted on the protrusion body 211, and has a larger outer diameter than the protrusion body 211 so as to pressurize a contact part 320. The outer diameter of the pressurization protrusion 213 is larger than the width of the guide rail 110 or the guide groove 120. Thus, the pressurization protrusion 213 prevents the protrusion body 211 from separating from the guide rail 110 or the guide groove 120.

The sensor part 300 senses a contact with the protrusion part 210 when the fixed part 100 is opened. Referring to FIG. 2, the sensor part 300 senses the contact of the protrusion part 210 through the pressurization of the protrusion part 210 which is moved along the guide rail 110 by the movement of the housing 200. The sensor part 300 senses the contact with the protrusion part 210 and thus senses that the housing 200 opens the fixed part 100.

The sensor part 300 may include a sensor body 310 and the contact part 320. The sensor body 310 is mounted on the guide rail 110. The sensor body 310 is mounted on the guide rail 110 so as to avoid the movement path of the protrusion part 210 moved on the guide rail 110.

The contact part 320 has one end mounted on the sensor body 310 and the other end spaced apart from the sensor body 310. The other end of the contact part 320 is elastically deformed by the pressurization of the protrusion part 210. That is, the other end of the contact part 320 is moved toward the sensor body 310 by the pressurization of the protrusion part 210, and elastically deformed and spaced apart from the sensor body 310 when the pressurization of the protrusion part 210 is released.

When the contact between the protrusion part 210 and the contact part 320 of the sensor part 300 is released, the sensor part 300 senses that the housing 200 is not moved by the driving part 400 but manually moved. The driving part 400 receives a signal which is generated when the sensor part 300 senses that the housing 200 is not moved by the operation of a separate switch button to activate the driving part 400 but manually moved by a passenger in the vehicle, and is operated to the right (see FIG. 3) such that the housing 200 closes the fixed part 100.

The driving part 400 moves the housing 200 to close the fixed part 100, moves the housing 200 toward the fixed part 100 when the contact between the sensor part 300 and the protrusion part 210 is released, and then closes the housing 200. When the housing 200 is manually moved by the passenger in the vehicle, the driving part 400 moves the housing 200 to close the fixed part 100. The driving part 400 is implemented as a combination of an actuator and a link.

The sensing switch part 500 is mounted on the housing 200, and senses separation between the housing 200 and the fixed part 100 while moved along the housing 200. The signal sensed by the sensing switch part 500 is transferred to the driving part 400 to operate the housing 200 to open/close the fixed part 100. The sensing switch part 500 senses the operation state by the driving part 400 when the sensor part 300 and the protrusion part 210 are contacted with each other, and senses the separation between the housing 200 and the fixed part 100. The sensing switch part 500 is implemented as a contact sensor.

The sensor part 300, the driving part 400 and the sensing switch part 500 are connected to a controller (not illustrated), the sensor part 300 and the sensing switch part 500 transfer a sensed signal to the controller, and the driving part 400 is operated by the signal of the sensor part 300 or the sensing switch part 500, which is transferred to the controller.

In accordance with the embodiment of the present invention, the glove box apparatus can prevent damage due to a malfunction when closing the glove box, such that the glove box can normally operate at all times.

Furthermore, since the glove box can normally operate even in case of a malfunction, the maintenance cost of the glove box can be reduced.

Although preferred embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A glove box apparatus comprising:
  a fixed part fixed to a vehicle body, and having a guide rail installed at a side surface thereof;
  a housing having a protrusion part moved along the guide rail, and configured to move the housing toward or away from the fixed part;
  a sensor part configured to sense a direct contact with the protrusion part; and
  a driving part configured to move the housing toward or away from the fixed part, and move the housing toward the fixed part when the direct contact between the sensor part and the protrusion part is released.

2. The glove box apparatus of claim 1, wherein the guide rail has a guide groove for guiding the movement of the protrusion part released from the contact with the sensor part.

3. The glove box apparatus of claim 2, wherein the guide groove is formed upward on one side of the guide rail.

4. The glove box apparatus of claim 3, wherein when the protrusion part is moved to the guide groove, the contact between the protrusion part and the sensor part is released.

5. The glove box apparatus of claim 1, wherein the sensor part comprises:

a sensor body mounted on the guide rail; and a contact part having one end mounted on the sensor body and another end spaced apart from the sensor body, and elastically deformed by pressurization of the protrusion part.

6. The glove box apparatus of claim 5, wherein the protrusion part comprises:

a protrusion body moved along the guide rail or the guide groove; and a pressurization protrusion mounted on the protrusion body so as to pressurize the contact part.

7. The glove box apparatus of claim 6, wherein the protrusion body has an outer diameter smaller than the width of the guide rail, and the pressurization protrusion has an outer diameter larger than the width of the guide rail.

8. The glove box apparatus of claim 1, further comprising a sensing switch part mounted on the housing, and configured to sense separation between the housing and the fixed part.

9. The glove box apparatus of claim 1, wherein the guide rail is formed in a curved shape.

10. The glove box apparatus of claim 1, wherein the driving part is configured to move the housing between being moved toward the fixed part and being moved away from the fixed part.

* * * * *